(12) United States Patent
Chen

(10) Patent No.: US 9,091,275 B2
(45) Date of Patent: Jul. 28, 2015

(54) INTEGRATED EGR MIXER AND PORTED SHROUD HOUSING COMPRESSOR

(75) Inventor: Hua Chen, Morristown, NJ (US)

(73) Assignee: Honeywell International Inc., Morristown, NJ (US)

(*) Notice: Subject to any disclaimer, the term of this patent is extended or adjusted under 35 U.S.C. 154(b) by 1571 days.

(21) Appl. No.: 12/553,787

(22) Filed: Sep. 3, 2009

(65) Prior Publication Data
US 2011/0048003 A1    Mar. 3, 2011

(51) Int. Cl.
  F02B 33/44    (2006.01)
  F04D 29/44    (2006.01)
  F04D 25/04    (2006.01)
  F02M 25/07    (2006.01)
  F04D 29/42    (2006.01)
  F02B 37/00    (2006.01)

(52) U.S. Cl.
  CPC ........... F04D 25/04 (2013.01); F02M 25/0706 (2013.01); F02M 25/0722 (2013.01); F02M 25/0739 (2013.01); F04D 29/4213 (2013.01); F04D 29/441 (2013.01); F02B 37/00 (2013.01); F05B 2220/40 (2013.01); Y02T 10/121 (2013.01)

(58) Field of Classification Search
  CPC .......... F02M 25/0706; F02M 25/0722; F02M 25/0739; F04D 29/4213; F04D 29/441; F04D 25/04; F02B 37/00; F02B 2220/40; Y02T 10/121
  USPC ........ 415/58.4, 147, 191, 163–165, 204–206; 60/605.2
  See application file for complete search history.

(56) References Cited

U.S. PATENT DOCUMENTS

| | | | |
|---|---|---|---|
| 3,829,235 A * | 8/1974 | Woollenweber, Jr. | 415/143 |
| 4,969,805 A * | 11/1990 | Romeo | 417/360 |
| 6,520,738 B2 * | 2/2003 | Sheoran et al. | 415/205 |
| 6,651,431 B1 * | 11/2003 | Yang et al. | 60/605.1 |
| 6,813,887 B2 * | 11/2004 | Sumser et al. | 60/611 |
| 7,475,539 B2 * | 1/2009 | Chen | 60/597 |
| 7,721,542 B2 * | 5/2010 | Chen | 60/605.2 |
| 7,775,759 B2 * | 8/2010 | Sirakov et al. | 415/1 |
| 8,021,104 B2 * | 9/2011 | Gu et al. | 415/56.5 |
| 2002/0131862 A1 * | 9/2002 | Sheoran et al. | 415/208.1 |
| 2006/0042245 A1 * | 3/2006 | Wimmer et al. | 60/605.2 |
| 2006/0275113 A1 * | 12/2006 | Chen | 415/206 |
| 2007/0144170 A1 * | 6/2007 | Griffith | 60/600 |
| 2007/0271921 A1 * | 11/2007 | Chen | 60/605.2 |
| 2007/0283698 A1 * | 12/2007 | Chen | 60/605.1 |
| 2008/0232952 A1 * | 9/2008 | Gu et al. | 415/11 |
| 2008/0247870 A1 * | 10/2008 | Sirakov et al. | 415/226 |
| 2009/0263234 A1 * | 10/2009 | Yin | 415/58.4 |
| 2010/0061843 A1 * | 3/2010 | Anderson et al. | 415/183 |
| 2010/0065029 A1 * | 3/2010 | Currie et al. | 123/568.17 |
| 2010/0229551 A1 * | 9/2010 | Wu et al. | 60/605.1 |
| 2011/0011084 A1 * | 1/2011 | Yanagida et al. | 60/605.2 |
| 2011/0110766 A1 * | 5/2011 | Moore et al. | 415/158 |

* cited by examiner

Primary Examiner — Thai Ba Trieu
Assistant Examiner — Paolo Isada
(74) Attorney, Agent, or Firm — Brian J. Pangrle

(57) ABSTRACT

An exemplary compressor housing includes a compressor volute; concentric walls that define an annular passage and a compressor wheel shroud disposed about a central axis where a compressor wheel positioned with respect to the shroud has an intended direction of rotation about the central axis; positioned with respect to the central axis, from a lower axial position to a higher axial position, a gas inlet to the annular passage, one or more ports extending between the shroud and the annular passage and a nozzle; and a gas volute to provide, to the gas inlet to the annular passage, gas having swirl in a direction opposite the intended direction of rotation of the compressor wheel. Various other exemplary devices, systems, methods, etc., are also disclosed.

19 Claims, 8 Drawing Sheets a: Ex. 731 shows better mixing at higher mass flow. (Total mass 0.18kg/s)
b: Ex. 731 shows better mixing at lower mass flow. (Total mass 0.17kg/s)

| Model | Example 731 | | Example 732 | | Example 733 | | Example 734 | |
|---|---|---|---|---|---|---|---|---|
| Boundary condition (Unit: kg/sec) | Mass.tot=0.17 Mass.gas=0.03 | | Mass.tot=0.18 Mass.gas=0.03 | | Mass.tot=0.17 Mass.gas=0.03 | | Mass.tot=0.17 Mass.gas=0.03 | |
| Wheel.in | | | | | | | | |
| Max Uniform Index Temp. | 0.94 | | 0.94 | | 0.92 | | 0.93 | |
| Max Uniform Index Entropy | 0.54 | | 0.51 | | 0.36 | | 0.44 | |
| Deviation Temperature [K] | 106 | | 87 | | 115 | | 94 | |
| Deviation Entropy | 282 | | 238 | | 305 | | 254 | |
| Compressor Discharge | | | | | | | | |
| Max Uniform Index Temp. | 0.999 | | 0.997 | | 0.949 | | 0.948 | |
| Max Uniform Index Entropy | 0.991 | | 0.984 | | 0.983 | | 0.842 | |
| Deviation Temperature [K] | 2.1 | | 3.8 | | 5.1 | | 13.5 | |
| Deviation Entropy | 5.6 | | 9.1 | | 10.9 | | 9.4 | |

$$\gamma(x) = 1 - \frac{1}{2} \sum_{n=1}^{N} \frac{A_n |(x_n - x_{ave})|}{A x_{ave}}$$

Uniform Index (higher is more uniform)
n - Index number on the section;
N - Max index number $$D(x) = \sqrt{\sum_{n=1}^{N} \frac{(x_n - x_{ave})^2}{N}}$$

Deviation (higher is less uniform)

INTEGRATED EGR MIXER AND PORTED SHROUD HOUSING COMPRESSOR

TECHNICAL FIELD

Subject matter disclosed herein relates generally to turbomachinery for internal combustion engines and, in particular, to equipment and techniques for recirculating exhaust gas.

BACKGROUND

Exhaust gas recirculation (EGR) is widely used to improve emissions of internal combustions engines. With respect to turbocharged internal combustion engines, use of EGR alters compressor operation. On a compressor map, EGR moves engine running lines toward or beyond compressor surge lines. Compressors working beyond the surge line are unstable and have increased risk of mechanical failure. Another concern with EGR is adequate mixing of exhaust gas and fresh air. Inadequate mixing of exhaust gas and air can diminish engine performance and decrease benefits of EGR. Various exemplary systems, devices and methods are described herein that can enhance EGR and compressor performance.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings where:

FIG. 8 is a table of computational results for the various configurations of FIG. 7.

DETAILED DESCRIPTION

Figure 1:
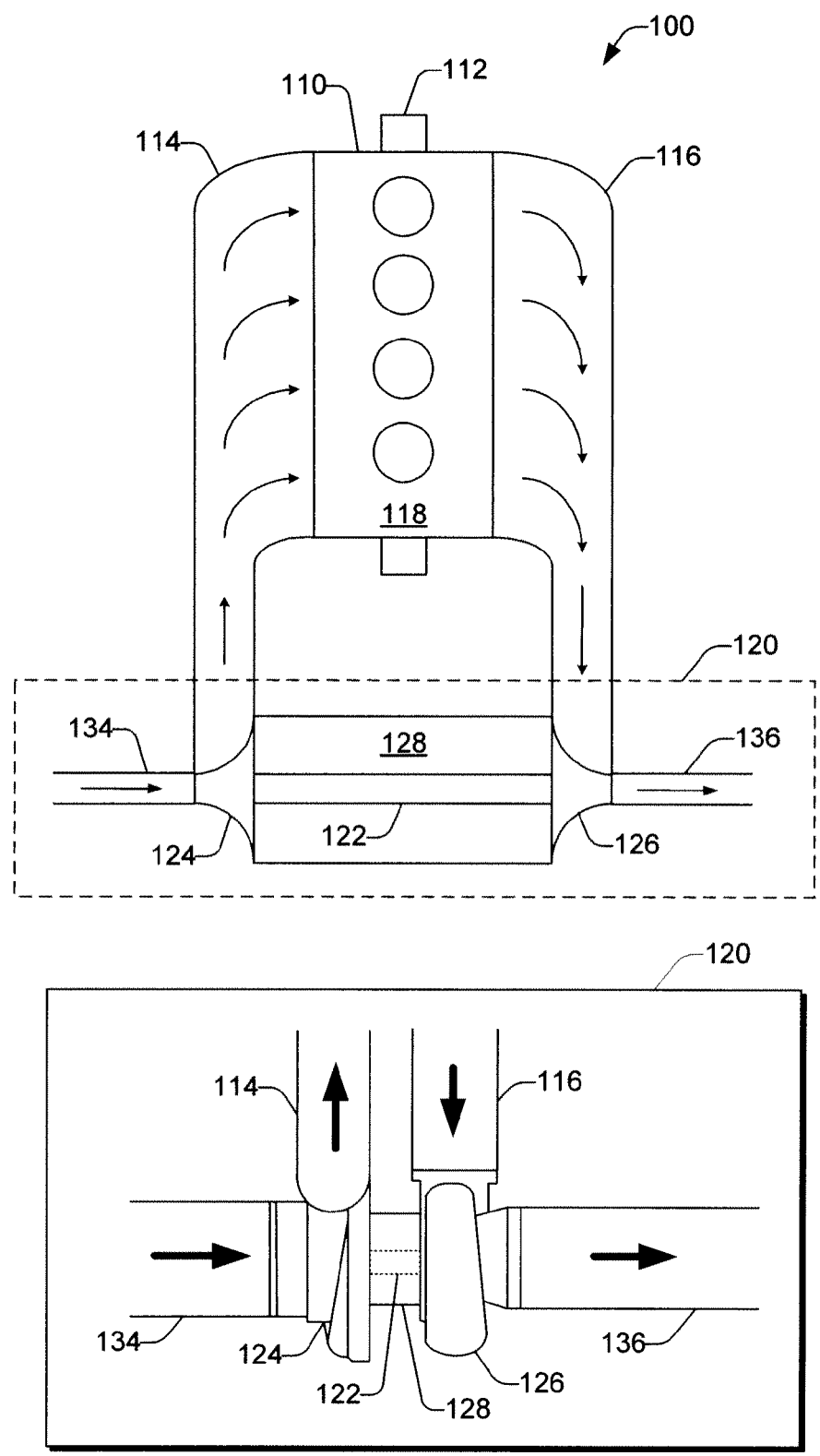
FIG. 1 is a diagram of a turbocharger and an internal combustion engine.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components.

Referring to the turbine 126, such a turbine optionally includes a variable geometry unit and a variable geometry controller. The variable geometry unit and variable geometry controller optionally include features such as those associated with commercially available variable geometry turbochargers (VGTs). Commercially available VGTs include, for example, the GARRETT® VNT™ and AVNT™ turbochargers, which use multiple adjustable vanes to control the flow of exhaust across a turbine. An exemplary turbocharger may employ wastegate technology as an alternative or in addition to variable geometry technology.

Figure 2:
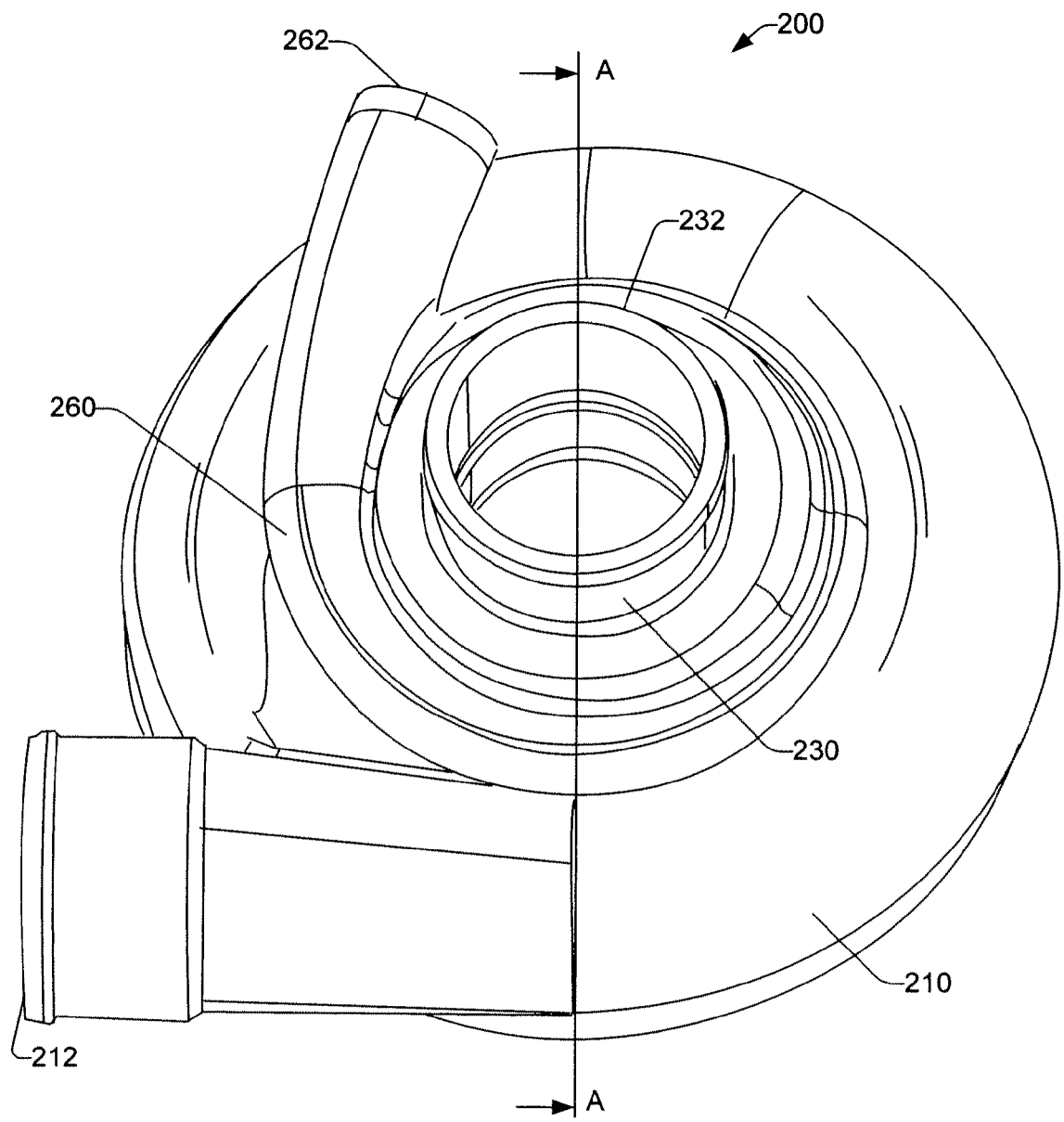
FIG. 2 is a perspective view of an exemplary compressor housing that includes a shrouded port and a passage for exhaust gas.

FIG. 2 shows a perspective view of an exemplary compressor housing 200 that includes a compressed air volute portion 210 having an outlet 212, an air intake portion 230 having an air inlet 232 and a gas volute portion 260 having a gas inlet 262. A line A-A defines a plane where cross-sectional views of the housing 200 along this plane are shown in FIG. 3.

Figure 3:
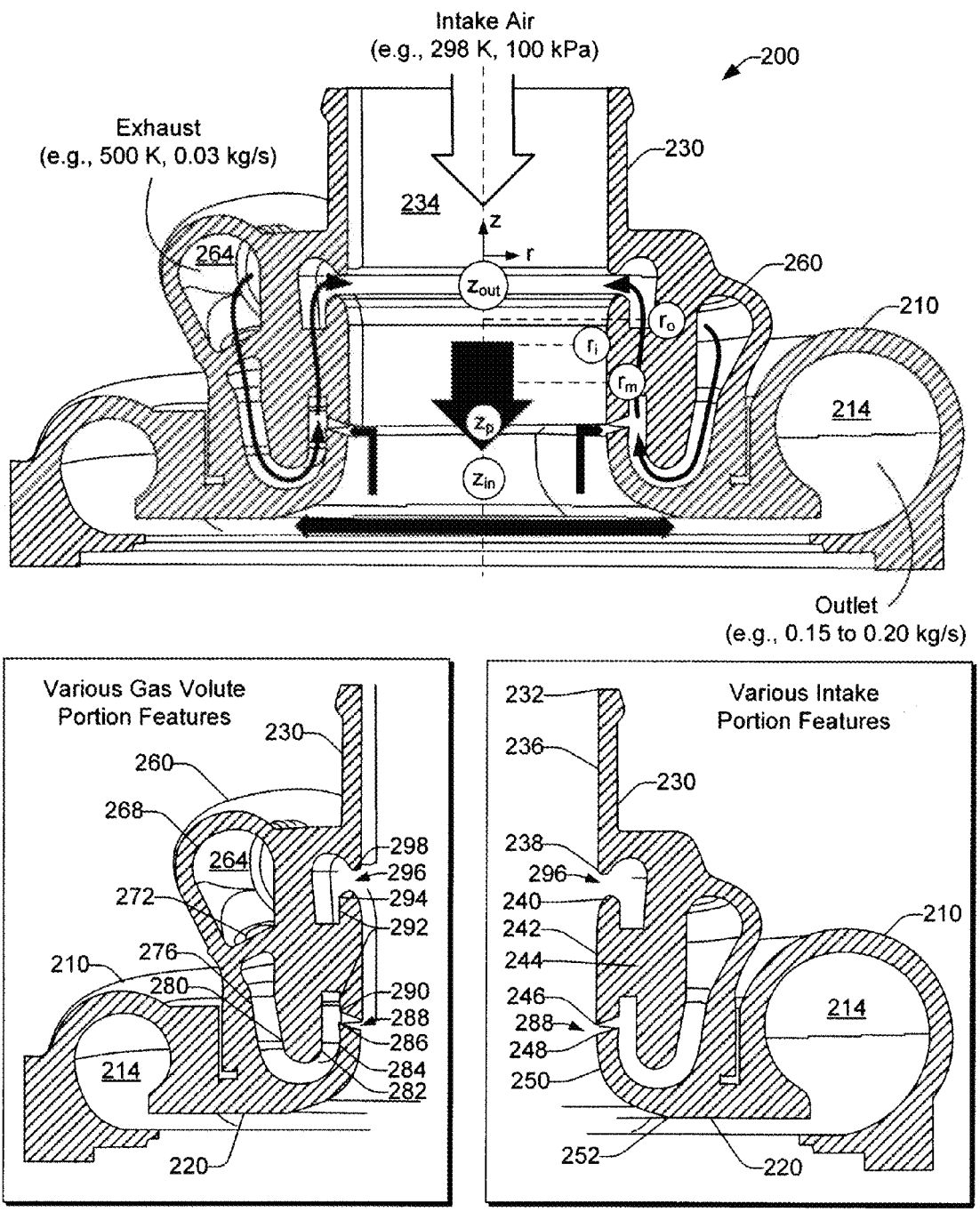
FIG. 3 is a cross-sectional view of the compressor housing of FIG. 2 along a line labeled A-A.

FIG. 3 shows cross-sectional views of the housing 200 of FIG. 2 with respect to a r, z coordinate system. An upper cross-sectional view shows various dimensions, including an outer wall radius, $r_o$, an intermediate wall radius, $r_m$, an inner wall radius, $r_i$, an axial location of a gas inlet $z_{in}$, an axial location of a port $z_p$ and an axial location of an opening or nozzle $z_{out}$. The cross-sectional view also shows arrows that represent flow of intake air, exhaust gas and mixed air and exhaust gas after some initial time. In this example, intake air is assumed to enter at 298 K and 100 kPa, exhaust gas is assumed to enter at 500 K and 0.03 kg/s. Given these values, per computational trials, the mixture of air and exhaust gas exits the housing 200 at a mass flow rate of about 0.15 to about 0.20 kg/s.

The computational trials demonstrate that when an internal combustion engine is working at low power, compressor mass flow is quite small and surge may occur. With EGR, in computational trials, exhaust gas at 500 K (e.g., optionally cooled to achieve a desired temperature) enters the EGR volute where, at an initial time, it mixes with the air (or a mix of gas and air at a later time) and then becomes compressed by the operation of the compressor wheel as the mixture passes through the compressor housing.

Before providing a description of flow in the housing 200, various details of the housing are described with respect to reference numerals. In a lower right cross-sectional view, details of the intake portion 230 are labeled while in a lower left cross-sectional view, details of the gas volute portion 260 are labeled.

As shown in the lower right view, the intake portion 230 includes an inlet defined by a lip 232. The intake portion 230 includes a substantially cylindrical wall 236 that extends axially downward from the lip 232 to an edge 238 to form an intake air space 234. After an axial gap that defines an opening 296 (e.g., a nozzle with an axial position $z_{out}$), the intake portion 230 continues at another edge 240, which defines, in part, a compressor wheel shroud. A substantially cylindrical wall 242 (e.g., an inner wall with a radius $r_i$) extends axially downward from the edge 240 to yet another edge 246. As shown in the example of FIG. 3, the wall 242 is supported by a connector 244 that extends radially outward to connect the shroud to the gas volute portion 260.

After another axial gap that defines another opening 288 (e.g., a port with an axial position $z_p$), the intake portion 230 continues at another edge 248. A shroud wall 250 extends from the edge 248 axially downward and radially outward to a junction 252, which joins the compressor wheel shroud with a substantially planar wall 220 of the compressed air volute portion 210. Specifically, the wall 220 forms an annular duct with a backplate or other component for passage of gas (e.g., air, exhaust, mixed air and exhaust) to a volute space 214 of the volute portion 210.

As shown in the lower left view, the gas volute portion 260 includes a substantially tubular wall 268 that defines a gas volute space 264. The tubular wall 268 has an oblong or bulbous cross-section (in a r,z-plane) that defines, along a lower axial portion or base, a substantially annular opening 272. The annular opening 272 leads to a passage having a substantially J- or U-shaped cross-section (in a r,z-plane). In the example of FIG. 3, the passage is defined by a pair of walls that define a substantially annular, axially descending passage that leads to an approximately 180 degree turn portion that leads to another substantially annular, axially ascending portion. To facilitate description, the pair of descending walls are labeled 276, 280 while after the turn, the pair of ascending walls are labeled 282 and 284. In other words, one wall has descending portion 276 and ascending portion 284 while the other wall has descending portion 280 and ascending portion 282. With reference to the upper cross-sectional view, the ascending wall 282 is shown with a radius $r_o$ while the ascending wall 284 is shown with a radius $r_m$. At an axial position $z_{in}$, the walls 282 and 284 define a gas inlet to an ascending passage.

In the example of FIG. 3, along a so-called intermediate radius (e.g., $r_m$), the wall 284 ascends to an edge 286. After a gap, commencing at an edge 290 that defines in part the opening 288 (e.g., a port with an axial position $z_p$), another wall 292 (e.g., disposed along $r_m$) extends axially upward to an edge 294 that defines in part the opening 296 (e.g., a nozzle with an axial position $z_{out}$). In the example of FIG. 3, the wall 282 (e.g., with an outer radius $r_o$) extends axially upward to a curved ceiling that descends slightly to end at an edge 298, which defines in part the opening 296 (e.g., a nozzle with an axial position $z_{out}$).

As shown in FIG. 3, the intake portion 210 and the gas volute portion 260 have various corresponding features. Specifically, the edge 286 corresponds with the edge 246, the edge 290 corresponds with the edge 244, the edge 294 corresponds with the edge 238 and the edge 298 corresponds with the edge 236. Further, the foregoing edges define the openings 288 (e.g., a port) and 296 (e.g., a nozzle). Flow of air and gas, via the openings 288 and 296, are described below with respect to the arrows in the upper cross-sectional view of FIG. 3.

In FIG. 3, a large open arrow represents intake air flowing inward to the intake space 234 via the inlet 232 of the intake portion 230 due to suction created by rotation of a compressor wheel (not shown). Smaller solid, curved arrows represent gas flowing to the intake portion 230 via the gas volute portion 260. Large solid arrows represent a mixture of air and gas flowing to the compressed air/gas volute space 214.

As indicated by the arrows, a circulation loop is established between the opening or port 288 and the opening or nozzle 296. At an initial starting point in time, at the opening 288, gas from the gas volute portion 260 mixes with intake air drawn into the compressor housing 200 via the inlet 232. This mixture then flows axially upward to the opening 296. At the opening 296, the mixture is introduced to intake air flowing into the compressor housing 200 via the inlet. Thus, very shortly after the initial time, a mixture of air and gas flows through the opening 288. This is referred to herein, with respect to flow, as a steady-state condition or a pseudo-steady-state condition.

The exemplary housing 200 of FIGS. 2 and 3 can operate as a mixer for exhaust gas recirculation (EGR). In such a configuration, the housing 200 is a mixer that relies, in part, on a ported shroud. EGR is widely used to improve emissions from internal combustion engines. However, EGR can push the engine running lines to the left and often beyond compressor surge lines on compressor maps (e.g., where compressor pressure ratio is plotted against corrected flow). Compressors working beyond the surge line are typically unstable and have increased risk of mechanical failure. Further, EGR requires adequate mixing of exhaust gas and intake air (e.g., fresh or ambient air) to ensure that the EGR can achieve its intended purpose. Yet further, for road vehicles, EGR must be implemented in limited space. As described herein, the exemplary housing 200 of FIGS. 2 and 3 can enhance compressor operation during EGR in a manner that does not have a significant impact on limited space of a road vehicle.

In the example of FIGS. 2 and 3, the gas volute portion 260 provides gas to a compressor wheel housed by the housing 200 where the gas has tangential velocity and momentum in a direction opposite the intended direction of rotation of the compressor wheel. The gas volute portion 260 acts to accelerate the gas and circumferentially and uniformly distributes it to a nozzle which has its throat (i.e., the opening 296) located at the entry region of the ported shroud. In such a configuration, the ported shroud serves three purposes: (i) acceleration of gas for better mixing; (ii) generation of a low pressure region around the port entry, which helps to draw air from the compressor impeller to the port; and (iii) prevention of gas flowing directly into the impeller through the port entry.

In the configuration of FIGS. 2 and 3, air (or a mixture of air and gas) drawn radially outward via the opening or port 288 (i.e., to the annular passage) will have a strong swirl (i.e., tangential velocity) in the same direction of rotation as the compressor wheel. On the other hand, gas entering the annular passage associated with the gas volute portion 260 will have a strong swirl in the opposite direction of compressor wheel rotation. Hence, mixing of gas from the gas volute portion 260 and air (or a mixture of air and gas) flowing radially outward via the opening 288 is enhanced due to the effects of counter-swirl.

Referring now to the opening or nozzle 296, the swirl direction of the ported shroud flow (i.e., flow emerging from the ported shroud), can have a significant influence on the effectiveness of the ported shroud. Specifically, if the swirl is in the same direction as compressor wheel rotation, the effectiveness of the ported shroud will be reduced because of reduced inducer work input to the flow. This is a condition that exists for conventional ported shrouds that reduces inducer work input. As described herein, the gas volute portion 260 can be used to affect swirl in a ported shroud. Specifically, the gas volute portion 260 can, depending on particular parameters (e.g., gas flow, dimensions, etc.), reduce swirl in the direction of rotation of a compressor wheel at a shroud nozzle (e.g., the opening 296) or even reverse the direction of swirl at a shroud nozzle (e.g., the opening 296).

As described herein, along a radial dimension, an exemplary compressor housing includes concentric walls (e.g., an inner wall, an intermediate wall and an outer wall) that define a substantially annular passage (e.g., between an outer wall and an intermediate wall) and a compressor wheel shroud (e.g., by an inner wall). The housing further includes a gas inlet to the annular passage, one or more ports to the annular passage and an outlet nozzle or nozzles for introduction of a gas or a mixture of gases (e.g., air and exhaust gas) to an inlet for a compressor wheel.

As described herein, an exemplary compressor housing uses energy of exhaust gas (e.g., pressure, mass flow, etc.) to generate a counter swirl. By mixing such counter swirling exhaust gas with air (or a mixture of air and exhaust gas) from a shroud port, swirl of the final mixture introduced to a compressor wheel is reduced and can even be reversed. Accordingly, together with the suction function provided by a shroud nozzle, introduction of counter-swirling gas improves effectiveness of a ported shroud.

As described herein, an exemplary compressor housing can achieve better mixing of gas and air (or gas and a mixture of air and gas) and improve compressor stability. For examples that include a dual volute approach (i.e., a gas volute and compressor volute), as described in more detail below, relative position of the volute tongues of the gas volute and the compressor volute can affect mixing. A particular exemplary configuration includes a 60 mm PV ported shroud compressor housing with an integrated EGR mixer.

Figure 4:
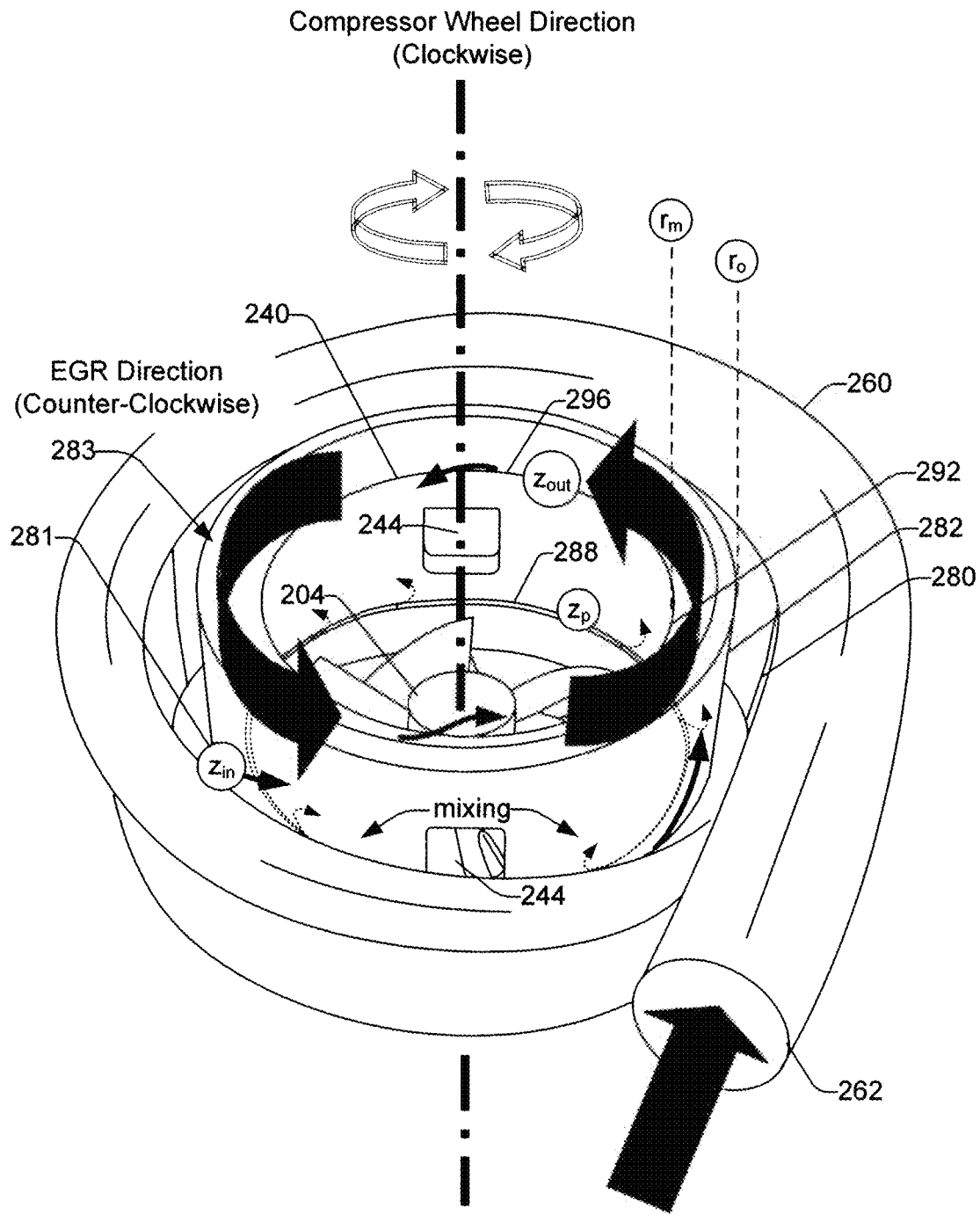
FIG. 4 is a perspective view of flow space for the exhaust gas passage and the compressor wheel of FIG. 3 that indicates an intended direction of rotation of the wheel and a direction of swirl of the exhaust gas.

FIG. 4 shows the flow space for the exemplary configuration of FIG. 3. Concentric walls, including an intermediate wall 292, an outer wall 282 and a volute space wall 280 define boundaries for the flow space shown in FIG. 4. The flow space includes a substantially annular passage 283 between the intermediate wall 292 and the outer wall 282. Connectors 244 are shown as void spaces that extend between the intermediate wall 292 and the outer wall 282 (noting that the inner wall 242 is not shown in FIG. 4). The configuration of FIG. 4 further includes a gas inlet 281 to the annular passage 283, one or more ports 288 to the annular passage 283 and an outlet nozzle 296 (or nozzles) for introduction of a gas or a mixture of gases (e.g., air and exhaust gas) to an inlet of a compressor wheel (e.g., defined in part by the edge 240). The gas inlet 281 is defined at least in part by the walls 282 and 284, as shown in FIG. 3. Such walls may include dividers or supports, which may define multiple gas inlets to an annular passage.

In the example of FIG. 4, the gas volute 260 receives gas via a volute inlet 262. Due to pressure at the volute inlet 262 and/or reduced pressure at the inlet 281 to the annular passage 283, gas flows or is drawn through the volute where it acquires tangential velocity and momentum in a direction opposite an intended direction of rotation of a compressor wheel 204.

At the one or more ports 288, the compressor wheel 204 drives air or a mixture of gas and air to the annular passage 283. Such a flow of air or a mixture of gas and air may further be due in part to a reduced pressure at the nozzle 296 caused by operation of the compressor wheel 204. At the one or more ports 288, the air or mixture of gas and air has tangential velocity and momentum in the same direction as the direction of rotation of the compressor wheel 204 (see small dashed arrows). Passing through the one or more ports 288, this gas or gas and air mixture encounters gas in the annular passage 283 with an opposite tangential velocity and momentum (see solid arrows). Accordingly, as indicated in FIG. 4, vigorous mixing occurs, which can alter the swirl of the gas or gas and air mixture entering via the one or more ports 288. Depending on the operational conditions, the size and shape of the one or more ports 288, gas pressure at the volute inlet 262, dimensions of the gas volute 260, etc., the mixture of gas and air exiting the annular passage 283 at the nozzle 296 has a reduced swirl or a swirl opposite the direction of rotation of the compressor wheel 204.

In a configuration with multiple ports, the ports may be arranged in various manners. For example, another port such as the port 288 of FIGS. 3 and 4 may exist, along with appropriate supports or connectors (see, e.g., the radially extending connectors 244). In another example, multiple ports may exist where none of the ports extends 360 degrees about a compressor wheel shroud. In yet another example, one or more ports may extend 360 degrees about a shroud while one or more other ports have smaller spans. With respect to axial position, multiple ports may exist at substantially the same axial position. Alternatively, one or more ports may be arranged at different axial positions.

As described herein, an exemplary method includes rotating a compressor wheel in a compressor housing where the compressor housing includes an annular passage that surrounds a ported shroud and where the rotation of the wheel draws air to an inducer portion of the compressor wheel; swirling exhaust gas in a direction opposite the direction of rotation of the compressor wheel; introducing the swirling exhaust gas to the annular passage; forcing air radially outward through one or more ports in the ported shroud to the annular passage; in the annular passage, mixing the swirling exhaust gas with the forced air; and introducing the mixed air and exhaust gas to the compressor wheel via a nozzle. Such a method can include drawing or forcing the exhaust gas through a gas volute to generate swirl. Depending on the various flow patterns, such a method can introduce via a nozzle a mixture with a swirl in a direction opposite the direction of rotation of the compressor wheel.

Figure 5:
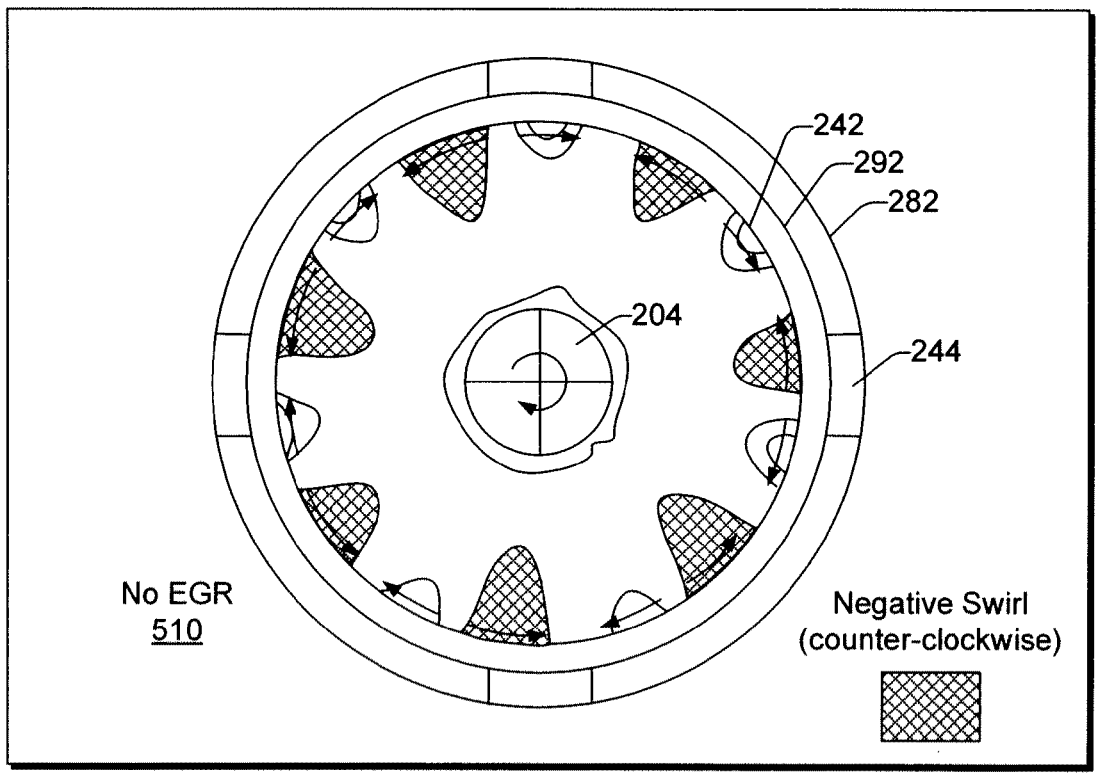
FIG. 5 is a contour plot of circumferential or tangential velocity in a plane without EGR and a contour plot of circumferential or tangential velocity in the same plane with EGR, as provided by an exemplary compressor housing.
Figure 5:
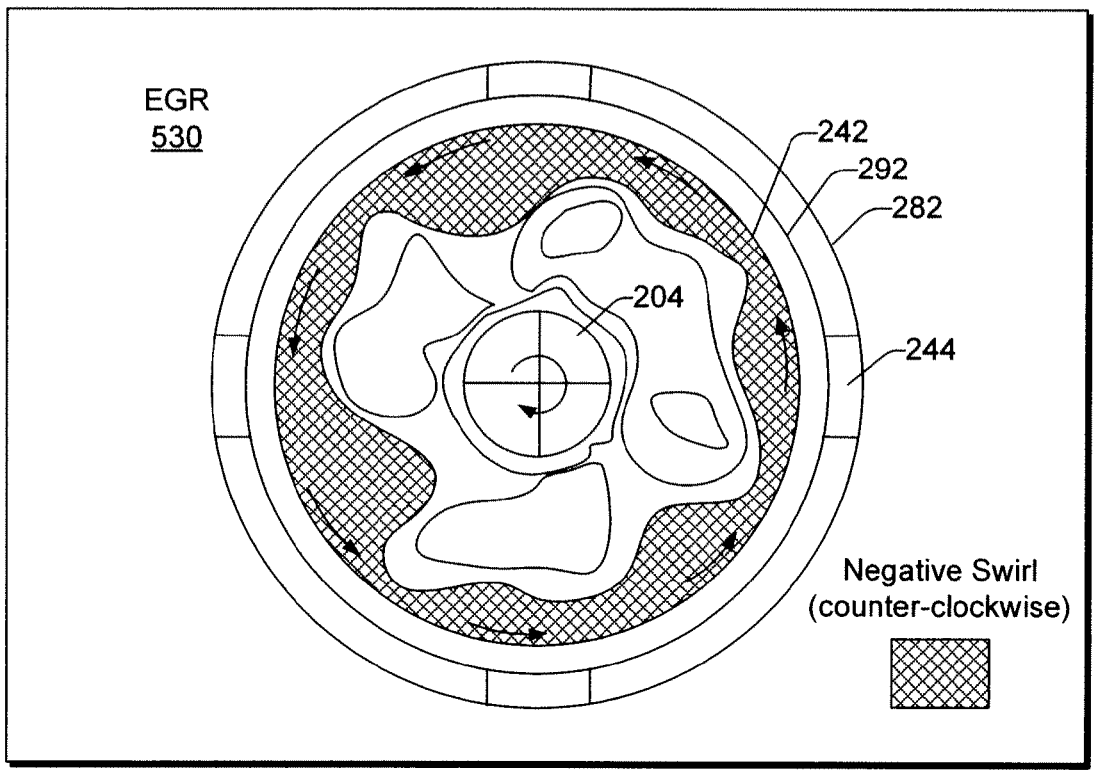

FIG. 5 shows contour plots for computation trials of an exemplary ported shroud without exhaust gas recirculation 510 and with exhaust gas recirculation 530. With reference to the example of FIG. 4, the plots 510, 530 show the compressor wheel 204, an inner wall (e.g., the wall 242 of FIG. 3), the connectors 244, the intermediate wall 292 and the outer wall 282.

The plot 510 demonstrates, that without EGR (i.e., no gas flow through the gas volute 260), only a few limited regions exist with negative swirl (i.e., swirl in a direction opposite the direction of rotation of the compressor wheel 204). In contrast, the plot 530 demonstrates, that with EGR, negative swirl is increased, especially in a region adjacent the inner wall 242 (e.g., along the compressor wheel shroud).

As described herein, an exemplary ported shroud and EGR volute arrangement can significantly alter flow pattern upstream of a compressor wheel. As shown in the example of FIG. 5, the compressor wheel 204 rotates clockwise while exhaust gas is introduced counter-clockwise. From the front view of the plots 510, 530, computational trials demonstrate that the circumferential velocity is altered significantly. As mentioned, this type of alteration in flow upstream a compressor wheel may improve performance and help to avoid surge.

Figure 6:
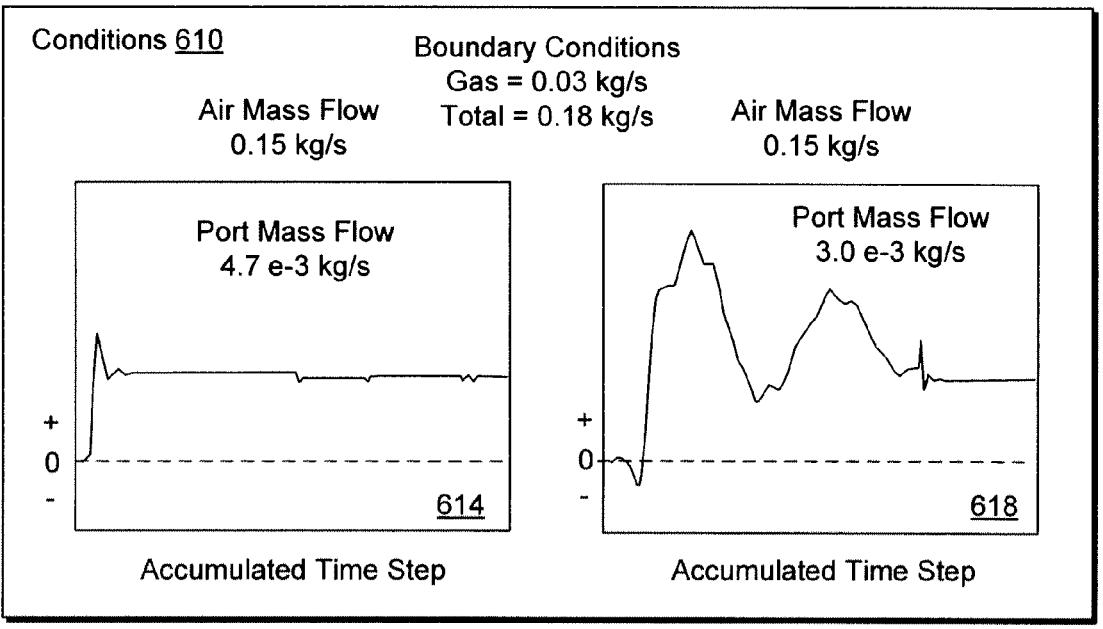
FIG. 6 is a series plots of computational results for EGR delivery via an exemplary compressor housing and another arrangement for EGR delivery via a conventional compressor housing.
Figure 6:
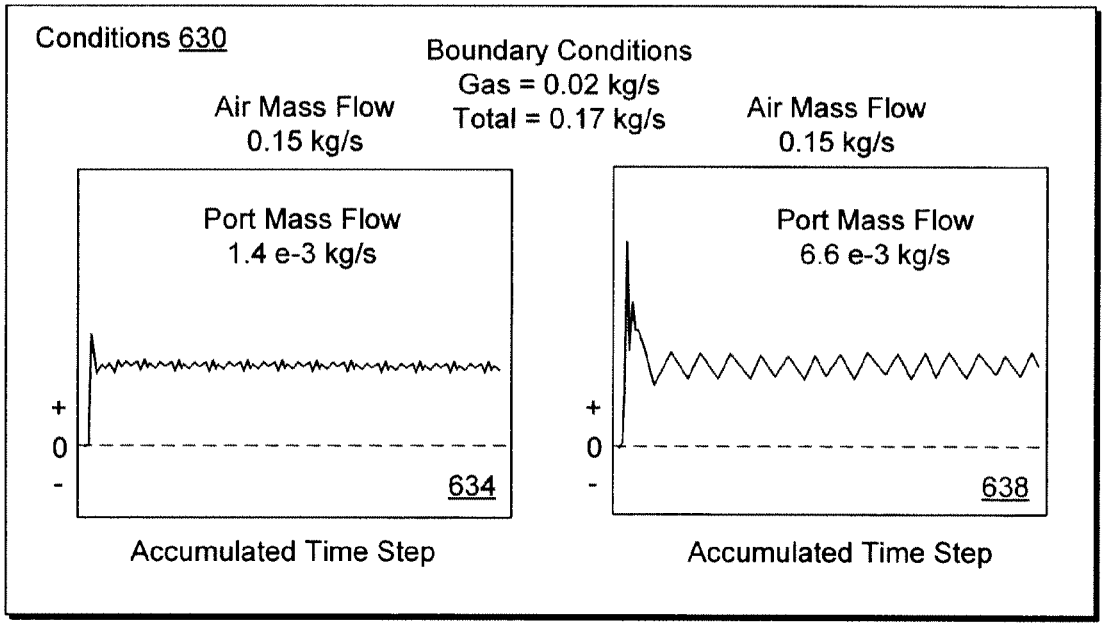

FIG. 6 shows a series of plots for different boundary conditions 610, 630 that compare performance of an exemplary ported shroud 614, 634 and another device 618, 638 for introducing exhaust gas to an inlet stream of a compressor. For the boundary conditions 610 (gas mass flow of 0.03 kg/s), data from computational trials in the plots 614, 618 demonstrate that the exemplary ported shroud has improved mass flow convergence and hence better flow stability than the other device. For the boundary conditions 630 (gas mass flow of 0.02 kg/s), data from computational trials in the plots 634, 638 demonstrate that the exemplary ported shroud has improved mass flow convergence and hence better flow stability than the other device.

Further, the computation trials demonstrate improved mixing and, for an increase in the gas flow rate (e.g., gas flow rate from 0.02 kg/s to 0.03 kg/s), the mixing effect becomes more prominent for the exemplary device compared to the other device. At 0.02 kg/s, temperature uniformity was 0.998 and 0.951 while temperature deviation was 2.46 K and 2.44 K, for the exemplary device and the other device, respectively. At 0.03 kg/s, temperature uniformity was 0.997 and 0.995 while temperature deviation was 3.80 K and 7.52 K, for the exemplary device and the other device, respectively (see FIG. 8 for definitions of uniformity and deviation).

Figure 7:
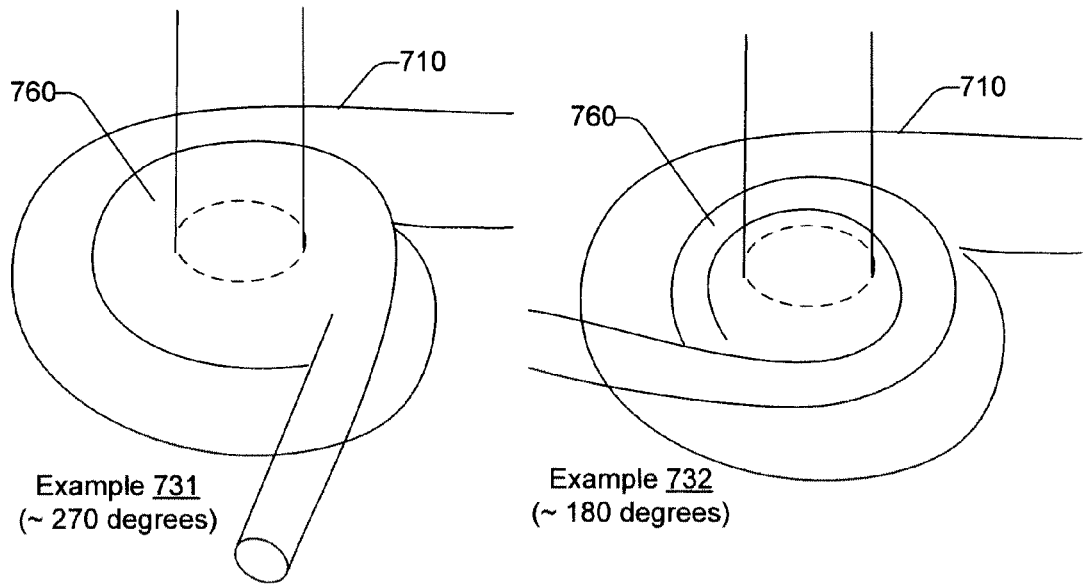
FIG. 7 is a series of perspective views of various exhaust passage configurations with respect to a scroll of a compressor housing.
Figure 7:
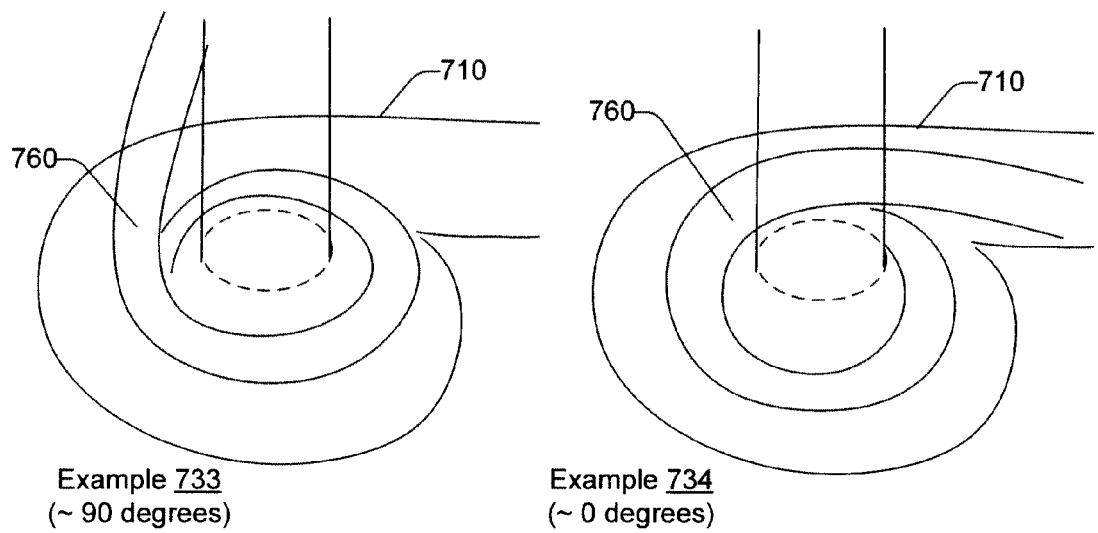

FIG. 7 shows various configurations for a tongue of a gas volute 760 and a tongue of a compressor volute 710. These examples include a 270 degree offset (example 731), a 180 degree offset (example 732), a 90 degree offset (example 733) and a 0 degree offset (example 734).

FIG. 8 shows a table of results from computational trials for the examples 731, 732, 733 and 734 of FIG. 7. The results demonstrate how offset between a gas volute 760 and a compressor volute 710 affects the performance of an exemplary compressor housing. Specifically, the results demonstrate that the example 731, with a 270 degree offset, provided better mixing at higher mass flow (e.g., total mass of 0.18 kg/s) and better mixing at lower mass flow (e.g., total mass of 0.17 kg/s). Equations are also provided in FIG. 8 for uniformity and deviation metrics. According to these metrics, a higher uniformity index predicts more uniform entropy or temperature while a higher deviation predicts less uniform entropy or temperature. The results of FIG. 8 show that tongue offset can have a significant effect on uniformity and deviation of temperature and entropy.

As described herein, a ported shroud for a compressor wheel includes concentric walls that define an annular passage and a compressor wheel shroud disposed about a central axis where a compressor wheel positioned with respect to the shroud has an intended direction of rotation about the central axis; positioned with respect to the central axis, from a lower axial position to a higher axial position, a gas inlet to the annular passage, one or more ports extending between the shroud and the annular passage and a nozzle; and a mechanism to provide, to the gas inlet to the annular passage, gas having swirl in a direction opposite the intended direction of rotation of the compressor wheel. In various examples, the mechanism is a gas volute, however, other mechanisms may provide such a swirl (e.g. drawing or forcing exhaust gas through vanes, etc.). As described herein, swirl can be characterized by tangential velocity and momentum (e.g., in a direction opposite the intended direction of rotation of a compressor wheel, in the same direction of rotation of a compressor wheel, clockwise, counter-clockwise, etc).

As described herein, a shroud may have a single port or multiple ports. A single port may extend partially or completely about a circumference of a shroud. In general, one or more ports are disposed at one or more positions along an axial span defined by and to be coincident with a compressor wheel (e.g., along an axial span of a blade or blades). Similarly, a nozzle may extend partially or completely about a circumference of a ported shroud.

As described herein, an exemplary compressor housing includes a compressor volute; concentric walls that define an annular passage and a compressor wheel shroud disposed about a central axis where a compressor wheel positioned with respect to the shroud has an intended direction of rotation about the central axis; positioned with respect to the central axis, from a lower axial position to a higher axial position, a gas inlet to the annular passage, one or more ports extending between the shroud and the annular passage and a nozzle; and a gas volute to provide, to the gas inlet to the annular passage, gas having swirl in a direction opposite the intended direction of rotation of the compressor wheel. Such a compressor housing may include a mount to mount the compressor housing to a center housing of a turbocharger (e.g., optionally including a backplate disposed between the compressor housing and the center housing). As described with respect to FIG. 7, a compressor volute can include a tongue and a gas volute can include a tongue and where the tongues are offset. For example, the offset may be an angle of approximately 270 degrees. As shown in various examples, a gas volute may be integral with a compressor housing (see, e.g., the housing 200 of FIGS. 2 and 3).

Although some exemplary methods, devices, systems, arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. A method comprising:
rotating a compressor wheel about an axis in a compressor housing that comprises an ascending annular passage that surrounds a ported shroud wherein the rotating draws air to an inducer portion of the compressor wheel;
swirling exhaust gas received from an internal combustion engine in a direction opposite the direction of rotation of the compressor wheel;
introducing the swirling exhaust gas via a gas inlet to the ascending annular passage;
forcing air radially outward through one or more ports in the ported shroud to the ascending annular passage wherein the one or more ports are located axially above the gas inlet to the ascending annular passage;
in the ascending annular passage, mixing the swirling exhaust gas with the forced air; and
introducing the mixed air and exhaust gas to the compressor wheel via a nozzle.

2. The method of claim 1 wherein the swirling comprises drawing or forcing the exhaust gas through a gas volute.

3. The method of claim 1 wherein the introducing the mixed air and exhaust gas to the compressor wheel via a nozzle introduces the mixture with a swirl in a direction opposite the direction of rotation of the compressor wheel.

4. An assembly comprising:
a compressor wheel that comprises blades oriented for rotation in a compression direction; and
a ported shroud that comprises
concentric walls that define an annular passage and a compressor) wheel shroud disposed about a central axis;
positioned with respect to the central axis, from a lower axial position to a higher axial position, a gas inlet to the annular passage, one or more ports extending between the shroud and the annular passage and a nozzle; and
a gas volute in gas communication with the gas inlet to the annular passage wherein the gas volute comprises a decreasing cross-sectional flow area in a direction opposite the compression direction of the compressor wheel.

5. The assembly of claim 4 wherein the gas volute comprises a volute inlet to receive gas and wherein the gas volute imparts swirl to the gas as it flows from the volute inlet through the gas volute and to the gas inlet to the annular passage.

6. The assembly of claim 5 wherein the swirl comprises a tangential velocity and momentum in a direction opposite the compression direction of the compressor wheel.

7. The assembly of claim 5 wherein the volute inlet comprises an exhaust gas inlet that receives exhaust gas from an internal combustion engine.

8. The assembly of claim 4 comprising a single port.

9. The assembly of claim 4 comprising multiple ports.

10. The assembly of claim 4 wherein the one or more ports are disposed at one or more positions along an axial span defined by and axially coincident with the compressor wheel.

11. The assembly of claim 4 wherein the) nozzle extends circumferentially about the ported shroud.

12. An assembly comprising:
 a compressor wheel that comprises blades oriented for rotation in a compression direction; and
 a compressor housing that comprises
  a compressor volute;
  concentric walls that define an annular passage and a compressor wheel shroud disposed about a central axis;
  positioned with respect to the central axis, from a lower axial position to a higher axial position, a gas inlet to the annular passage, one or more ports extending between the shroud and the annular passage and a nozzle; and
 a gas volute in gas communication with the gas inlet to the annular passage wherein the gas volute comprises a decreasing cross-sectional flow area in a direction opposite the compression direction of the compressor wheel.

13. The assembly of claim 12 wherein the compressor volute comprises a tongue and wherein the gas volute comprises a tongue and wherein the tongues comprise an offset.

14. The assembly of claim 13 wherein the offset comprises an angle of approximately 270 degrees.

15. The assembly of claim 12 further comprising a center housing mount to mount the compressor housing to a center housing of a turbocharger.

16. The assembly of claim 12 wherein the gas volute comprises an exhaust gas inlet that receives exhaust gas from an internal combustion engine.

17. The assembly of claim 12 wherein the shroud comprises multiple ports.

18. The assembly of claim 12 wherein the one or more ports are disposed at one or more positions along an axial span defined by and axially coincident with the compressor wheel as housed by the compressor housing.

19. The assembly of claim 12 wherein the nozzle extends circumferentially about the shroud.

\* \* \* \* \*